Patented May 2, 1950

2,506,428

UNITED STATES PATENT OFFICE 2,506,428

CONDENSATION PRODUCT AND PROCESS

Earl T. McBee and Jack S. Newcomer, West Lafayette, Ind., assignors to the United States of America as represented by the United States Atomic Energy Commission No Drawing. Application November 21, 1945, Serial No. 630,126

2 Claims. (Cl. 260—654)

This invention relates to the production of highly chlorinated organic compounds and is particularly concerned with the manufacture of such compounds from chlorinated organic compounds containing a smaller number of carbon atoms in the molecule.

An object of the invention is the preparation of novel chlorinated hydrocarbon products. A further object of the invention is the production of a new compound suitable for use as an intermediate in the manufacture of highly stable fluorinated compounds. A further object of the invention is the production of chlorinated organic products of low hydrogen content suitable for fluorination by replacement of chlorine with fluorine by known fluorination methods.

When hexachloropropene is dehalogenated by means of copper, zinc, or cuprous chloride two isomeric 6-carbon condensation products are produced. One of these has a melting point of about 90° C. and the other has a melting point of about 180° C. The compound melting at about 180° C. has the molecular formula $C_6Cl_8$ and was reported by Prins to be octachlorohexatriene. It will be referred to herein as $C_6Cl_8$ (M. P. 180° C.).

In accordance with the present invention it has been found that $C_6Cl_8$ (M. P. 180° C.) condenses with trichlorethene in the presence of a Friedel-Crafts condensing agent to form a crystalline solid of the formula $C_8HCl_{11}$ having a melting point of about 160° C.

The condensation process of the invention proceeds at ordinary temperatures. For instance, the reaction may be initiated at a temperature of about 20° C. and may be carried to substantial completion with a temperature rise of only four or five degrees. At temperatures below about 10° C. the reaction is very slow and at temperatures of about 50° C. and above may be accompanied by substantial side reaction.

The process may be carried out using an excess of either trichlorethene or $C_6Cl_8$. The $C_6Cl_8$ may be dissolved in an inert solvent such as dichloromethane and trichlorethene may be added gradually or all at once to the solution.

The process may be carried out using a conventional Friedel-Crafts condensing agent, for instance, a chloride of aluminum, iron, tin, titanium, zirconium or zinc, or aluminum bromide, boron trifluoride or hydrogen fluoride, or mixtures of such condensing-agents.

The final product, because of its high chlorine content and low hydrogen content, is valuable as an intermediate for the preparation of highly fluorinated organic compounds containing eight carbon atoms. The fluorination may be effected by means of hydrogen fluoride in the presence of pentavalent antimony salts such as the fluorochlorides. The low hydrogen content of the $C_8HCl_{11}$ product is especially important because normally the hydrogen fluoride fluorination process does not replace hydrogen and hence more expensive fluorinating agents are necessary to accomplish this purpose.

The following example illustrates the invention.

Example

Five parts by weight of $C_6Cl_8$ of 179–180° C. melting point (obtained by heating hexachloropropene with cuprous chloride at 60° C. for three hours and isolating the desired organic product by extraction of the inorganic material with water, distillation of volatile organic material, and recrystallization of the residue from acetone) was warmed with three parts by weight of anhydrous aluminum chloride in 20 parts by weight of trichlorethene to a temperature of about 25° C. After a few minutes the mixture became a dark red in color and then it was cooled to about 15° C. and maintained at this temperature for three hours. The reaction product was washed with water and dried by contact with anhydrous calcium sulfate. After separation of this material by filtration, the product was fractionally distilled to eliminate unreacted trichlorethene. A solid residue remained. This residue was dark in color and was crystallized twice from acetone by preparing a substantially saturated solution of the material in hot acetone and allowing the solution to cool. The second crystallization gave about 3 parts by weight of the compound $C_8HCl_{11}$, a white solid melting at 158–159° C.

It will be understood that we intend to include variations and modifications of the invention and that the preceding example is illustrative only and in no wise to be construed as a limitation upon the invention, the scope of which is defined in the appended claims, wherein

We claim:

1. The method of making a highly chlorinated hydrocarbon of the molecular formula $C_8HCl_{11}$ which comprises condensing an octachlorohexatriene which has been obtained by the condensation of hexachloropropene and which has a melting point of about 180° C. with trichloroethene in the presence of anhydrous aluminum chloride at a temperature between about 10° C. and about 50° C.

2. As a new compound, the white, crystalline chlorinated hydrocarbon melting at about 160° C. and having the molecular formula $C_8HCl_{11}$ which is obtained by the method recited in claim 1.

EARL T. McBEE.
JACK S. NEWCOMER.

REFERENCES CITED

The following references are of record in the file of this patent:

Prins, "Rec. des. Trav. Chim. des Pays Bas," vol. 5, pages 1065–1072 (1932).